United States Patent
Xu

(10) Patent No.: US 9,978,028 B2
(45) Date of Patent: May 22, 2018

(54) METHODS, APPARATUS, AND COMMUNICATION SYSTEMS FOR USER MANAGEMENT

(71) Applicant: TENCENT TECHNOLOGY (SHENZHEN) COMPANY LIMITED, Shenzhen (CN)

(72) Inventor: Bo Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 590 days.

(21) Appl. No.: 14/639,660

(22) Filed: Mar. 5, 2015

(65) Prior Publication Data

US 2015/0178668 A1 Jun. 25, 2015

Related U.S. Application Data

(63) Continuation of application No. PCT/CN2014/082309, filed on Jul. 16, 2014.

(30) Foreign Application Priority Data

Jul. 22, 2013 (CN) .......................... 2013 1 0309053

(51) Int. Cl.
*G06Q 10/06* (2012.01)
*G06F 9/48* (2006.01)

(52) U.S. Cl.
CPC ... *G06Q 10/063114* (2013.01); *G06F 9/4881* (2013.01)

(58) Field of Classification Search
None
See application file for complete search history.

(56) References Cited

U.S. PATENT DOCUMENTS 6,856,970 B1 * 2/2005 Campbell .............. G06Q 40/00
  705/35
7,325,082 B1 * 1/2008 Schibinger .............. G06F 9/526
  370/369

(Continued)

FOREIGN PATENT DOCUMENTS

CN 1925416 A 3/2007
CN 1941718 A 4/2007

(Continued)

OTHER PUBLICATIONS

The State Intellectual Property Office of the People's Republic of China (SIPO) Office Action 1 for 201310309053.7 dated Sep. 2, 2015 pp. 1-8.

(Continued)

*Primary Examiner* — Christopher Revak
(74) *Attorney, Agent, or Firm* — Anova Law Group, PLLC

(57) ABSTRACT

Methods, apparatus, and communication systems for user management are provided. A batch operation request from a client is received. The batch operation request contains a first user identification (ID), a first user group ID, and a batch operation type ID. It is then determined whether a first user indicated by the first user ID has a batch operation authorization. When the first user is determined to have the batch operation authorization and according to a batch operation type indicated by the batch operation type ID, a batch operation is processed to users in a first user group indicated by the first user group ID or processed to users that request to join the first user group.

20 Claims, 5 Drawing Sheets

(56) References Cited

U.S. PATENT DOCUMENTS

| | | | | |
|---|---|---|---|---|
| 2005/0171811 A1* | 8/2005 | Campbell | ............ | G06Q 40/02 |
| | | | | 705/35 |
| 2006/0015608 A1* | 1/2006 | Becker | .................. | H04L 69/40 |
| | | | | 709/224 |
| 2007/0179978 A1* | 8/2007 | Lee | ...................... | G06Q 30/06 |
| 2008/0091941 A1* | 4/2008 | Yonezawa | ............ | H04L 9/3255 |
| | | | | 713/158 |
| 2014/0236904 A1* | 8/2014 | Kuppuswamy | ..... | G06F 11/3672 |
| | | | | 707/690 |

FOREIGN PATENT DOCUMENTS

| | | |
|---|---|---|
| CN | 101166118 A | 4/2008 |
| CN | 101179519 A | 5/2008 |
| CN | 101267609 A | 9/2008 |
| CN | 103346921 A | 10/2013 |
| TW | 201012149 A | 3/2010 |
| WO | 2005120112 A1 | 12/2005 |

OTHER PUBLICATIONS

The State Intellectual Property Office of the People's Republic of China (SIPO) Office Action 2 for 201310309053.7 dated Jan. 5, 2016 pp. 1-5.
The World Intellectual Property Organization (WIPO) International Search Report for PCT/CN2014/082309 dated Oct. 22, 2014.

* cited by examiner

METHODS, APPARATUS, AND COMMUNICATION SYSTEMS FOR USER MANAGEMENT

CROSS-REFERENCES TO RELATED APPLICATIONS

This application is a continuation application of PCT Patent Application No. PCT/CN2014/082309, filed on Jul. 16, 2014, which claims priority to Chinese Patent Application No. 201310309053.7, filed on Jul. 22, 2013, the entire content of both of which is incorporated herein by reference.

FIELD OF THE DISCLOSURE

The present disclosure generally relates to the field of computer technology and, more particularly, relates to methods, apparatus, and communication systems for user management.

BACKGROUND

With development of Internet technology, there are more applications based on Internet. Some applications may allow a large number of users to simultaneously conduct their businesses online. For this scenario, management of this large number of users needs to be considered. However, current technology does not provide any management mechanism for the scenario that a large number of users are simultaneously conducting businesses online. This tremendously limits development of the businesses.

Thus, there is a need to overcome these and other problems of the prior art and to provide methods, apparatus, and communication systems for user management.

BRIEF SUMMARY OF THE DISCLOSURE

One aspect or embodiment of the present disclosure includes a user management method. In the method, a batch operation request from a client is received. The batch operation request contains a first user identification (ID), a first user group ID, and a batch operation type ID. It is then determined whether a first user indicated by the first user ID has a batch operation authorization. When the first user is determined to have the batch operation authorization and according to a batch operation type indicated by the batch operation type ID, a batch operation is processed to users in a first user group indicated by the first user group ID or processed to users that request to join the first user group.

Another aspect or embodiment of the present disclosure includes a user management apparatus. The apparatus includes a receiving unit, a determining unit, and a batch operation unit.

The receiving unit is configured to receive a batch operation request from a client. The batch operation request includes a first user identification (ID), a first user group ID, and a batch operation type ID. The determining unit is configured to determine whether a first user indicated by the first user ID has a batch operation authorization. The batch operation unit is configured to process a batch operation to users in a first user group indicated by the first user group ID or to process the batch operation to users that request to join the first user group, when the first user is determined to have the batch operation authorization and according to a batch operation type indicated by the batch operation type ID.

Another aspect or embodiment of the present disclosure includes a communication system. The system includes a client and a business server.

The client is configured to send a batch operation request including a first user identification (ID), a first user group ID, and a batch operation type ID. The business server is configured to receive the batch operation request from the client, configured to determine whether a first user indicated by the first user ID has a batch operation authorization; and configured to process a batch operation to users in a first user group indicated by the first user group ID or to process the batch operation to users that request to join the first user group, when the first user is determined to have the batch operation authorization and according to a batch operation type indicated by the batch operation type ID.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Various embodiments provide user management methods, apparatus and communication systems to allow user management for a large number of users and to simplify interactions between users.

In an exemplary user management method, a batch operation request from a client is received. The batch operation request contains a first user identification (ID), a first user group ID, and a batch operation type ID. It is then determined whether a first user indicated by the first user ID has a batch operation authorization. When the first user is determined to have the batch operation authorization and according to a batch operation type indicated by the batch operation type ID, a batch operation is processed to users in a first user group indicated by the first user group ID or processed to users that request to join the first user group.

Figure 1:
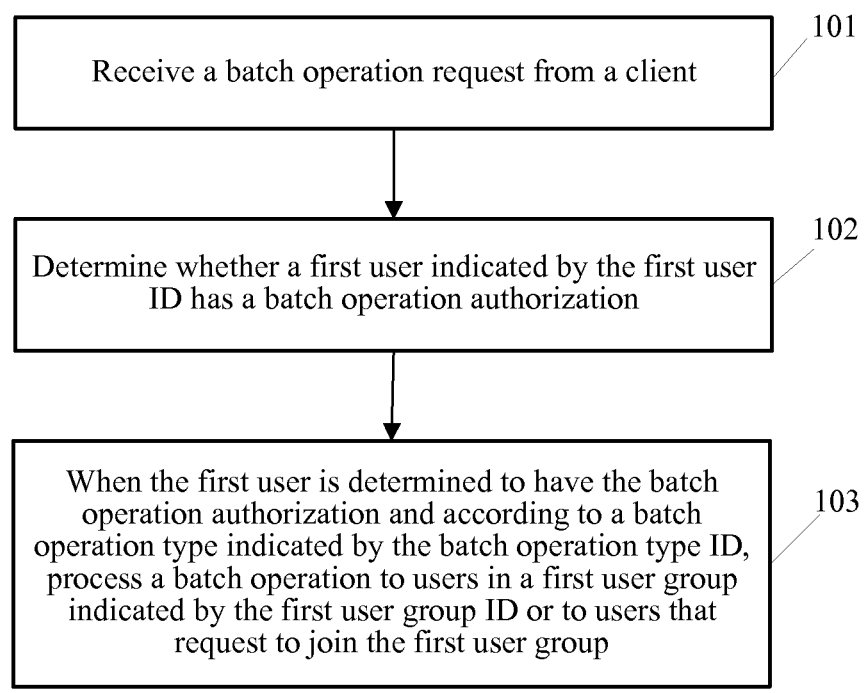
FIG. 1 depicts an exemplary user management method consistent with various disclosed embodiments.

FIG. 1 depicts an exemplary user management method consistent with various embodiments.

In Step 101, a batch operation request from a client is received. The batch operation request contains a first user identification (ID), a first user group ID, and a batch operation type ID. In various embodiments, the batch operation type indicated by the batch operation type ID can be, for example, a batch removing operation, a batch adding operation, a batch user-data-modifying operation, and/or any suitable other type batch operations.

In various embodiments, before receiving the batch operation request from the client, a login request containing the first user ID can further be received from the client. When the user indicated by the first user ID has the login authorization, the login authorization operation corresponding to the login request can be implemented. Of course, such login step can be omitted when there is no need to perform a business login.

In Step 102, it is determined whether a first user indicated by the first user ID has a batch operation authorization.

In various embodiments, operation authorization of a user indicated by each user ID can be recorded in a database. Some users (e.g., a user-group administrator) may have the batch operation authorization, some users (e.g., a user-group administrator) may have a single user operation authorization, and some users (e.g., a general user in a user group) may not have any operation authorization.

In Step 103, when the first user is determined to have the batch operation authorization and according to a batch operation type indicated by the batch operation type ID, a batch operation is processed to users in a first user group indicated by the first user group ID or to users that request to join the first user group.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a first threshold value (such as about two years, three years, five years, or other threshold value); can include that the user has a monthly telephone charge exceeding a second threshold value (such as about $80, $100, $150, $200 or other threshold value); and can include that the user has a user level exceeding a third threshold value.

To process the batch operation to users in the first user group having the first user group ID according to the batch operation type indicated by the batch operation type ID, the batch operation can be processed to number N1 users in the first user group having the first user group ID, according to the batch operation type indicated by the batch operation type ID. The number N1 users can include all of the users that satisfy a filter condition described in the filter-condition descriptive information in the first group, and the number N1 is a positive integer.

In various embodiments, to process the batch operation to the number N1 users in the first user group having the first user group ID according to the batch operation type indicated by the batch operation type ID, user data (e.g., including a saved telephone charge amount of a user, times of getting free monthly-combos of a user, a weapon equipment of a user, and/or an empirical value of a user) corresponding to the number N1 users in the first user group indicated by the first user group ID can be batch updated, according to the batch operation type indicated by the batch operation type ID.

In various embodiments, to process the batch operation to the number N1 users in the first user group having the first user group ID according to the batch operation type indicated by the batch operation type ID, the number N1 users can be batch removed (in this example, the above-mentioned batch operation type corresponds to a batch removing operation) from the first user group indicated by the first user group ID according to the batch operation type indicated by the batch operation type ID.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a third threshold value (such as about one year, two years, five years, or other threshold value); can include that the user has a monthly telephone charge exceeding a fifth threshold value (such as about $50, $80, $100, $200 or other threshold value); and/or can include that the user has a user level exceeding a sixth threshold value.

To process the batch operation to users that request to join the first user group according to the batch operation type indicated by the batch operation type ID, the batch operation (e.g., a batch adding operation, a batch user-data-modifying operation, and/or other type batch operations) can be processed to number N2 users that request to join the first user group. The number N2 users can include all of users that request to join the first user group and that satisfy a filter condition described in the filter-condition descriptive information, and the number N2 is a positive integer.

In various embodiments, the batch operation type indicated by the batch operation type ID includes a batch joining user-group operation. The processing of the batch operation to the number N2 users that request to join the first user group according to the batch operation type indicated by the batch operation type ID includes: batch joining the number N2 users that request to join the first user group into the first user group.

In various embodiments, the disclosed user management method further includes: receiving a single-user-operation request from the client. The single-user-operation request contains a first user ID, a second user ID, and a single-user-operation type ID. It is then determined whether the first user indicated by the first user ID has a single-user-operation authorization. When the first user is determined to have the single-user-operation authorization, a single-user operation can be processed to a second user indicated by the second user ID, according to a single-user-operation type indicated by the single-user-operation type ID. In various embodiments, the single-user-operation type can be, for example, an adding-to-user-group operation, a removing-from-user-group operation, a user-data-modifying operation, and/or other suitable operations. In various embodiments, the first user is an operating user, while the second user is a user being operated.

In various embodiments, to process a single-user operation to the second user indicated by the second user ID according to a single-user-operation type indicated by the single-user-operation type ID, user data of the second user indicated by the second user ID can be modified according to a single-user-operation type indicated by the single-user-operation type ID. For example, the modifying of the user data can include modifying the saved telephone charge amount of a user, modifying the times of getting free monthly-combos of a user, modifying a weapon equipment of a user, and/or modifying an empirical value of a user. In this exemplary scenario, the single-user-operation is an operation for modifying user data.

In various embodiments, to process the single-user-operation to the second user indicated by the second user ID according to the single-user-operation type indicated by the single-user-operation type ID, users of the second user indicated by the second user ID can be added into a second user group according to a single-user-operation type indicated by the single-user-operation type ID. In this scenario, the single-user-operation is an operation of adding-to-user-group operation.

In various embodiments, to process the single-user-operation to the second user indicated by the second user ID according to a single-user-operation type indicated by the single-user-operation type ID, users of the second user indicated by the second user ID can be removed from the second user group according to a single-user-operation type indicated by the single-user-operation type ID. In this scenario, the single-user-operation can be an operation of removing-from-user-group operation.

It should be noted that, in different scenarios, the user group may have various forms/patterns. For example, in an online game, a legion can be considered as a user group, while in other scenarios, an interest group can be considered as a user group, and so on. Any suitable group can form a user group. Different user groups can have different user group IDs, and different user group IDs can identify different user groups. The user data can include, for example, user property data and/or user resource amount.

It should be noted that, the disclosed user management method can be implemented in a business server or a user data server or other network server. For example, the business server (or the user data server or any other network server) can receive a batch operation request from a client, the batch operation request containing a first user identification (ID), a first user group ID, and a batch operation type ID. The business server can determine whether a first user indicated by the first user ID has a batch operation authorization, and process the batch operation to users in the first user group indicated by the first user group ID or process the batch operation to users that request to join the first user group, when the first user is determined to have the batch operation authorization and according to the batch operation type indicated by the batch operation type ID.

That is, after receiving the first user ID, the first user group ID, and the batch operation type ID from the client, the batch operation is processed to users in the first user group indicated by the first user group ID or the batch operation is processed to users that request to join the first user group, when the first user is determined to have the batch operation authorization and according to a batch operation type indicated by the batch operation type ID. Due to the batch operation mechanism, a batch operation with respect to multiple users can be accomplished based on an operation request from the client. As such, the batch operation mechanism can facilitate managing a large number of users, and can provide an easy interaction mechanism. In addition, an authentication mechanism for the batch operation is provided, which improves safety and reliability of the multi-user operation.

Figure 2:
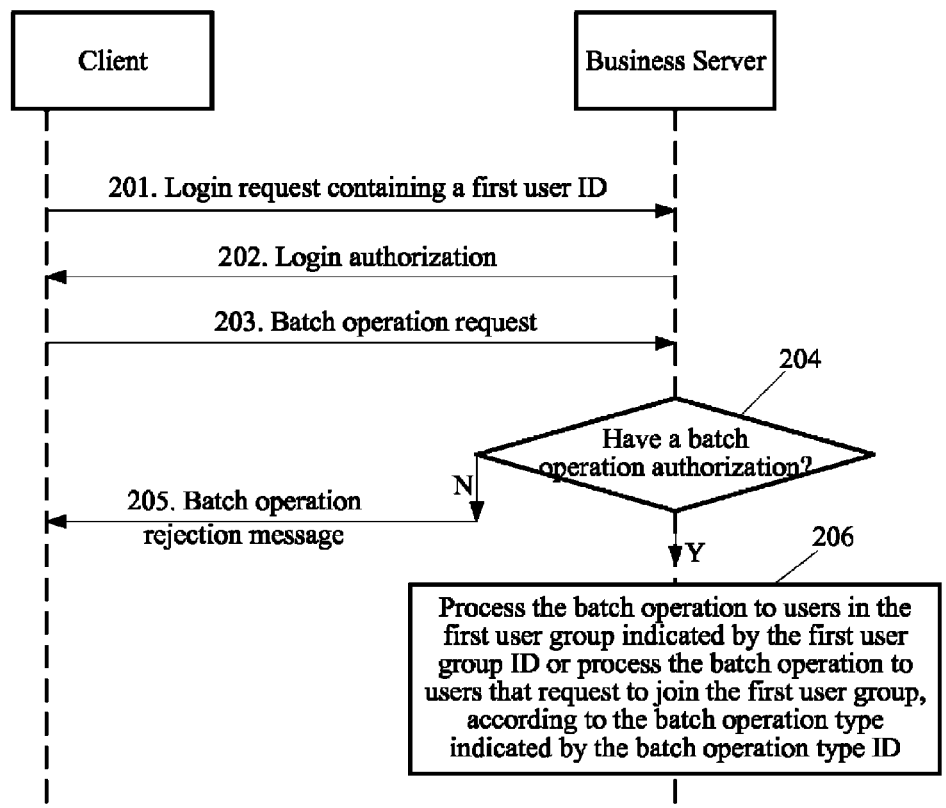
FIG. 2 depicts another exemplary user management method consistent with various disclosed embodiments.

FIG. 2 depicts another exemplary user management method consistent with various embodiments.

In Step 201, a client sends a login request containing a first user ID to a business server.

In Step 202, the business server receives the login request from the client and performs a login authorization operation corresponding to the login request, when the user indicated by the first user ID has a login authorization.

In Step 203, the client sends a batch operation request to the business server. The batch operation request contains a first user identification (ID), a first user group ID, and a batch operation type ID.

In various embodiments, the batch operation type indicated by the batch operation type ID can be, for example, a batch removing operation, a batch adding operation, a batch user-data-modifying operation, and/or any suitable other type batch operations.

In Step 204, the business server receives the batch operation request from the client, and determines whether a first user indicated by the first user ID has a batch operation authorization. When the first user has the batch operation authorization, Step 206 can then be implemented. When the first user does not have the batch operation authorization, Step 205 can then be implemented.

In various embodiments, operation authorization of a user indicated by each user ID can be recorded in a database. Some users (e.g., a user-group administrator) may have the batch operation authorization, some users (e.g., a user-group administrator) may have a single user operation authorization, and some users (e.g., a general user in a user group) may not have any operation authorization.

In Step 205, the business server sends a rejection message of batch operation to the client.

In Step 206, the business server processes the batch operation to users in the first user group indicated by the first user group ID or processes the batch operation to users that request to join the first user group, according to the batch operation type indicated by the batch operation type ID.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a first threshold value (such as about two years, three years, five years, or other threshold value); can include that the user has a monthly telephone charge exceeding a second threshold value (such as about $80, $100, $150, $200 or other threshold value); and can include that the user has a user level exceeding a third threshold value.

To process the batch operation to users in the first user group having the first user group ID according to the batch operation type indicated by the batch operation type ID, the batch operation can be processed to number N1 users in the first user group having the first user group ID, according to the batch operation type indicated by the batch operation type ID. The number N1 users can include all of the users that satisfy a filter condition described in the filter-condition descriptive information in the first group, and the number N1 is a positive integer.

In various embodiments, to process the batch operation to the number N1 users in the first user group having the first user group ID according to the batch operation type indicated by the batch operation type ID, user data (e.g., including a saved telephone charge amount of a user, times of getting free monthly-combos of a user, a weapon equipment of a user, and/or an empirical value of a user) corresponding to the number N1 users in the first user group indicated by the first user group ID can be batch updated, according to the batch operation type indicated by the batch operation type ID.

In various embodiments, to process the batch operation to the number N1 users in the first user group having the first user group ID according to the batch operation type indicated by the batch operation type ID, the number N1 users can be batch removed (in this example, the above-mentioned batch operation type corresponds to a batch removing operation) from the first user group indicated by the first user group ID according to the batch operation type indicated by the batch operation type ID.

The batch operation request further contains filter-condition descriptive information. For example, according to different application scenarios, various filter conditions can be described in the filter-condition descriptive information. In various embodiments, the filter conditions can include that the user uses a network in a number of years exceeding a third threshold value (such as about one year, two years, five years, or other threshold value); can include that the user has a monthly telephone charge exceeding a fifth threshold value (such as about $50, $80, $100, $200 or other threshold value); and/or can include that the user has a user level exceeding a sixth threshold value.

To process the batch operation to users that request to join the first user group according to the batch operation type indicated by the batch operation type ID, the batch operation (e.g., a batch adding operation, a batch user-data-modifying operation, and/or other type batch operations) can be processed to number N2 users that request to join the first user group. The number N2 users can include all of users that request to join the first user group and that satisfy a filter condition described in the filter-condition descriptive information, and the number N2 is a positive integer.

In various embodiments, the batch operation type indicated by the batch operation type ID includes a batch joining user-group operation. The processing of the batch operation to the number N2 users that request to join the first user group according to the batch operation type indicated by the batch operation type ID includes: batch joining the number N2 users that request to join the first user group into the first user group.

It should be noted that, in different scenarios, the user group may have various forms/patterns. For example, in an online game, a legion can be considered as a user group, while in other scenarios, an interest group can be considered as a user group, and so on. Any suitable group can form a user group. Different user groups can have different user group IDs, and different user group IDs can identify different user groups. The user data can include, for example, user property data and/or user resource amount.

As such, after receiving the first user ID, the first user group ID and the batch operation type ID from the client, the batch operation is processed to users in the first user group indicated by the first user group ID or the batch operation is processed to users that request to join the first user group, when the first user is determined to have the batch operation authorization and according to a batch operation type indicated by the batch operation type ID. Due to the batch operation mechanism, a batch operation with respect to multiple users can be accomplished based on an operation request from the client. As such, the batch operation mechanism can facilitate managing a large number of users, and can provide an easy interaction mechanism. In addition, an authentication mechanism for the batch operation is provided, which improves safety and reliability of the multi-user operation.

Figure 3:
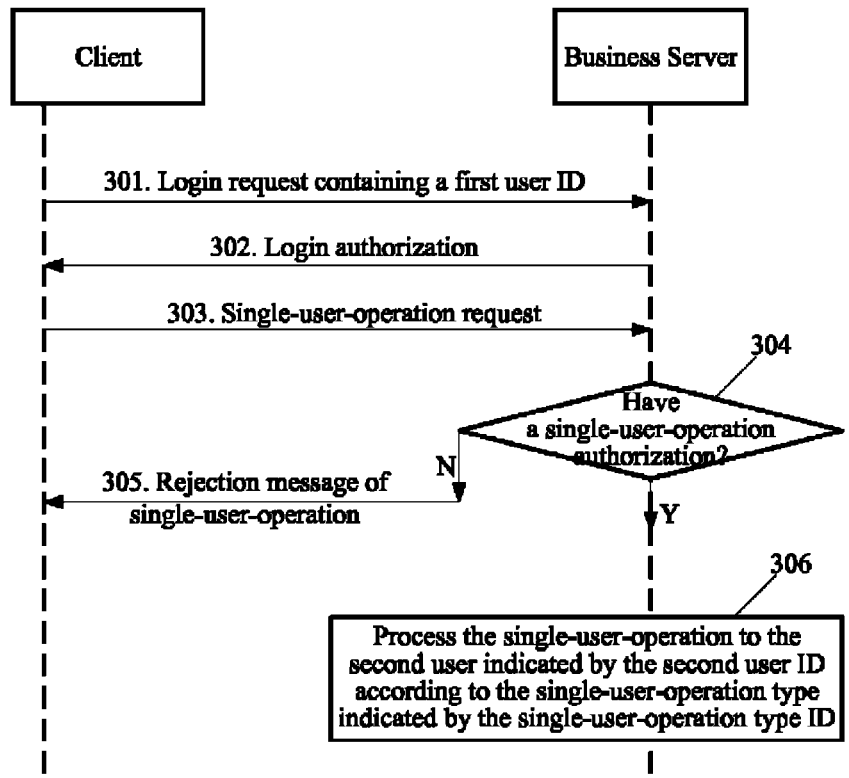
FIG. 3 depicts another exemplary user management method consistent with various disclosed embodiments.

FIG. 3 depicts another exemplary user management method consistent with various embodiments.

In Step 301, a client sends a login request containing a first user ID to a business server.

In Step 302, the business server receives the login request from the client and performs a login authorization operation corresponding to the login request, when the user indicated by the first user ID has a login authorization.

In Step 303, the client sends a single-user-operation request to the business server.

For example, the single-user-operation request contains a first user ID, a second user ID, and a single-user-operation type ID. The first user ID and the second user ID can have different data formats and/or different containing locations for the business server to distinguish which one is the user to be operated and which one is the operating user operates other user(s).

In various embodiments, the single-user-operation type indicated by the single-user-operation type ID can be, for example, an adding-to-user-group operation, a removing-from-user-group operation, a user-data-modifying operation, and/or other suitable operations.

In Step 304, the business server receives the single-user-operation request from the client, and determines whether a first user indicated by the first user ID has a single-user-operation authorization.

When the first user has the single-user-operation authorization, Step 306 can be implemented. When the first user does not have the single-user-operation authorization, Step 305 can be implemented.

In various embodiments, operation authorization of a user indicated by each user ID can be recorded in a database. Some users (e.g., a user-group administrator) may have the batch operation authorization, some users (e.g., a user-group administrator) may have a single user operation authorization, and some users (e.g., a general user in a user group) may not have any operation authorization.

In Step 305, the business server sends a rejection message of single-user-operation to the client.

In Step 306, the business server processes the single-user-operation to the second user indicated by the second user ID, according to the single-user-operation type indicated by the single-user-operation type ID.

In various embodiments, to process a single-user-operation to the second user indicated by the second user ID according to a single-user-operation type indicated by the single-user-operation type ID, user data of the second user indicated by the second user ID can be modified according to a single-user-operation type indicated by the single-user-operation type ID. For example, the modifying of the user data can include modifying the saved telephone charge amount of a user, modifying the times of getting free monthly-combos of a user, modifying a weapon equipment of a user, and/or modifying an empirical value of a user. In this exemplary scenario, the single-user-operation is an operation for modifying user data.

In various embodiments, to process the single-user-operation to the second user indicated by the second user ID, according to the single-user-operation type indicated by the single-user-operation type ID, users of the second user indicated by the second user ID can be added into a second user group according to a single-user-operation type indicated by the single-user-operation type ID. In this scenario, the single-user-operation is an operation of adding-to-user-group operation.

In various embodiments, to process the single-user-operation to the second user indicated by the second user ID according to a single-user-operation type indicated by the single-user-operation type ID, users of the second user indicated by the second user ID can be removed from the second user group according to a single-user-operation type indicated by the single-user-operation type ID. In this scenario, the single-user-operation can be an operation of removing-from-user-group operation.

It should be noted that, in different scenarios, the user group may have various forms/patterns. For example, in an online game, a legion can be considered as a user group, while in other scenarios, an interest group can be considered as a user group, and so on. Any suitable group can form a user group. Different user groups can have different user group IDs, and different user group IDs can identify different user groups. The user data can include, for example, user property data and/or user resource amount.

An exemplary embodiment can include an application scenario where a network game server (as an exemplary business server) manages "ten thousand the guild" in a network game. The network game is also referred to as an online game, which uses Internet as a transmission medium, uses personal computers and the online game server provided by the operators as processing devices, and uses the game client software as information exchanging window to achieve entertainment, leisure, communication, and virtual achievements in a persistent, individual, multiplayer-online game.

For example, in a legion online game, a legion can be considered as a user group. A user A is set as a legion commander and can have a batch operation authorization. The user A logs in the online game server through a client. The online game server can determine the authorization of user A. When having the authorization, the user can process a batch operation of "ten thousand the guild" and/or can process a single-user-operation. For the single-user-operation, user data can be operated directly without delay. For the batch operation, the online game server can record the batch operation information, and the user data server can timed-ly (e.g., regularly or periodically) process the batch operation. Of course, the user data server can also timely process the batch operation without delay.

For example, the user B1, user B2, user B3 . . . user Bn can be set as members of the legion. When logging in the online game server, the user A can select a user to be operated and the online game server can send the user ID of the legion member B1 selected by the user A to the user data server. After receiving the single-user-operation request, the user data server can process corresponding operation to the user B1.

In one example, when the single-user-operation is an approving operation, the user data server modifies the legion ID (or user group ID) of the user B1 to identify that the user B1 has been approved as a legion member. The user data server can send a "upd" request to the online game server, and the "upd" request contains: the legion ID of the legion to be joined by the user B1, a game ID of the user B1, the user ID of the user B1, to inform the online game server that the user B1 has become the member of a certain legion (having the legion ID). Then, the client can know that the user B1 has become the member of a certain legion through the online game server.

In another example, when the single-user-operation is a deleting operation, the user data server modifies the legion ID of the user B1 to identify that the user B1 has been removed from the legion. When the user B1 is successfully removed, the user data server can send a "upd" request to the online game server, and the "upd" request contains the legion ID, the game ID of the user B1, the operation code of the deleting operation, to inform the online game server that the user B1 is not to be the member of a certain legion. Then, the client can know that the user B1 is no longer a member of the certain legion through the online game server.

In still another example, when the single-user-operation is a using-"vest-role" (e.g., an alternative ID of a same player that other users may or may not know) operation, the online game server can inform the user data server that the user B1 needs to use a vest-role through a "upd" request. The user data server modifies the user resource data of the user B1 to use the vest-role for the user B1. Then, the client can know, what the user B1's new vest-role is, through the game server or through the user data server.

For the batch operation, the user A can send the batch operation request to the user data server through the online game server, and the batch operation request contains the legion ID (e.g., as a user group ID), a batch operation type ID, a time stamp, a user ID of user A (that is, the user ID of an operator). The user data server records the batch operation information.

The user data server can timed-ly scan and record the batch operation information on a daily basis to obtain the legion ID of the batch operation and the batch operation type ID. The user data server can also determine whether the user indicated by an operator ID (e.g., the user ID of user A) has the batch operation authorization to the legion indicated by the legion ID. When the user has the batch operation authorization to the legion, the user data server can pull the legion members B1, B2, B3 . . . Bn from the legion indicated by the legion ID, and according to the batch operation type indicated by the batch operation type ID, can batch operate the user data of the legion members B1, B2, B3 . . . Bn; or, according to the batch operation type indicated by the batch operation type ID, can batch remove the legion members B1, B2, B3 . . . Bn from the legion.

The disclosed user management method can provide significant management for the "Ten thousand the guild" on an online game, and can rapidly process a batch management of members in the guild including operations of a batch deleting, a batch approving, a batch "vest-role" using, etc. The operation is greatly simplified compared with conventional management methods.

Figure 4A:
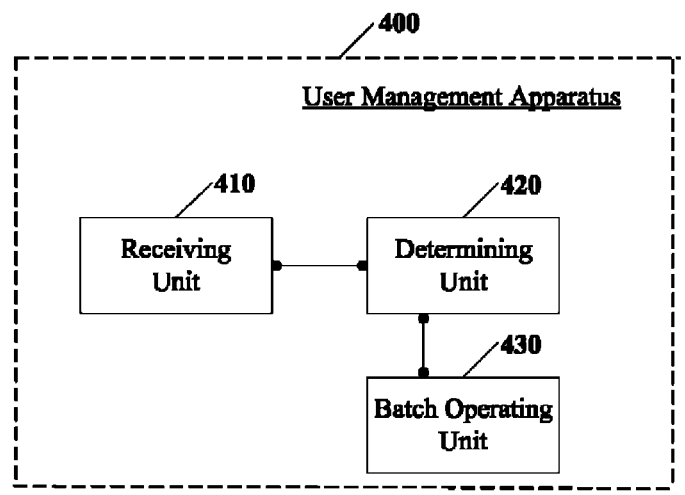
FIG. 4a depicts an exemplary user management apparatus consistent with various disclosed embodiments.

FIG. 4A provides an exemplary user management apparatus 400. The exemplary user management apparatus 400 includes a receiving unit 410, a determining unit 420, and a batch operating unit 430.

The receiving unit 410 is configured to receive a batch operation request from a client. The batch operation request contains a first user identification (ID), a first user group ID, and a batch operation type ID.

The determining unit 420 is configured to determine whether a first user indicated by the first user ID has a batch operation authorization.

The batch operating unit 430 is configured to process a batch operation to users in a first user group indicated by the first user group ID or to process the batch operation to users that request to join the first user group, when the first user is determined to have the batch operation authorization by the determining unit 420 and according to a batch operation type indicated by the batch operation type ID.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a first threshold value (such as about two years, three years, five years, or other threshold value); can include that the user has a monthly telephone charge exceeding a second threshold value (such as about $80, $100, $150, $200 or other threshold value); and can include that the user has a user level exceeding a third threshold value.

To process the batch operation to users in the first user group having the first user group ID according to the batch operation type indicated by the batch operation type ID, the batch operation can be processed to number N1 users in the first user group having the first user group ID, according to the batch operation type indicated by the batch operation type ID. The number N1 users can include all of the users that satisfy a filter condition described in the filter-condition descriptive information in the first group, and the number N1 is a positive integer.

In various embodiments, to process the batch operation to the number N1 users in the first user group having the first user group ID according to the batch operation type indicated by the batch operation type ID, user data (e.g., including a saved telephone charge amount of a user, times of getting free monthly-combos of a user, a weapon equipment of a user, and/or an empirical value of a user) corresponding to the number N1 users in the first user group indicated by the first user group ID can be batch updated, according to the batch operation type indicated by the batch operation type ID.

In various embodiments, to process the batch operation to the number N1 users in the first user group having the first user group ID according to the batch operation type indicated by the batch operation type ID, the batch operating unit 430 can batch remove the number N1 users (in this example, the above-mentioned batch operation type corresponds to a batch removing operation) from the first user group indicated by the first user group ID according to the batch operation type indicated by the batch operation type ID.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a third threshold value (such as about one year, two years, five years, or other threshold value); can include that the user has a monthly telephone charge exceeding a fifth threshold value (such as about $50, $80, $100, $200, or other threshold value); and/or can include that the user has a user level exceeding a sixth threshold value.

To process the batch operation to users that request to join the first user group according to the batch operation type indicated by the batch operation type ID, the batch operating unit 430 can be configured to process the batch operation (e.g., a batch adding operation, a batch user-data-modifying operation, and/or other type batch operations) to number N2 users that request to join the first user group. The number N2 users can include all of users that request to join the first user group and that satisfy a filter condition described in the filter-condition descriptive information, and the number N2 is a positive integer.

In various embodiments, the batch operation type indicated by the batch operation type ID includes a batch joining user-group operation. To process the batch operation to the number N2 users that request to join the first user group according to the batch operation type indicated by the batch operation type ID, the batch operating unit 430 can be configured to batch join the number N2 users that request to join the first user group into the first user group.

In various embodiments, the receiving unit 410 is further configured to receive a single-user-operation request from the client. The single-user-operation request contains a first user ID, a second user ID, and a single-user-operation type ID. The determining unit 420 is further configured to determine whether the first user indicated by the first user ID has a single-user-operation authorization.

Figure 4B:
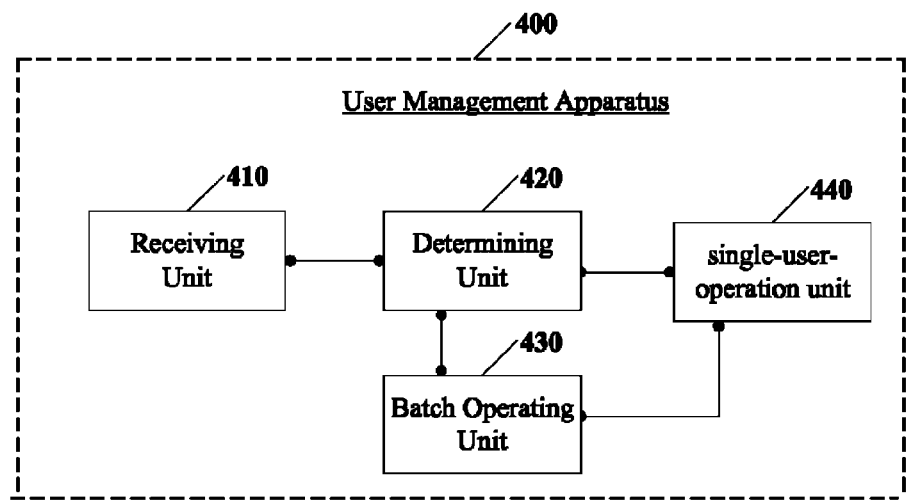
FIG. 4b depicts another exemplary user management apparatus consistent with various disclosed embodiments.

Referring to FIG. 4B, the user management apparatus 400 further includes: a single-user-operation unit 440.

The single-user-operation unit 440 is configured to process a single-user operation to a second user indicated by the second user ID when the determining unit 420 determines that the first user has the single-user-operation authorization, and according to a single-user-operation type indicated by the single-user-operation type ID. In various embodiments, the single-user-operation type can be, for example, an adding-to-user-group operation, a removing-from-user-group operation, a user-data-modifying operation, and/or other suitable operations. In various embodiments, the first user is an operating user, while the second user is a user being operated.

In various embodiments, to process a single-user operation to the second user indicated by the second user ID and according to a single-user-operation type indicated by the single-user-operation type ID, the single-user-operation unit 440 can be configured to modify user data of the second user indicated by the second user ID according to a single-user-operation type indicated by the single-user-operation type ID. For example, the modifying of the user data can include modifying the saved telephone charge amount of a user, modifying the times of getting free monthly-combos of a user, modifying a weapon equipment of a user, and/or modifying an empirical value of a user. In this exemplary scenario, the single-user-operation is a user-data-modifying operation.

In various embodiments, to process the single-user operation to the second user indicated by the second user ID according to the single-user-operation type indicated by the single-user-operation type ID, the single-user-operation unit 440 is configured to add users of the second user indicated by the second user ID into a second user group according to a single-user-operation type indicated by the single-user-operation type ID. In this scenario, the single-user-operation is an adding-to-user-group operation.

In various embodiments, to process the single-user operation to the second user indicated by the second user ID according to a single-user-operation type indicated by the single-user-operation type ID, the single-user-operation unit 440 can remove users of the second user indicated by the second user ID from the second user group according to a single-user-operation type indicated by the single-user-operation type ID. In this scenario, the single-user-operation is a removing-from-user-group operation.

It should be noted that, in different scenarios, the user group may have various forms/patterns. For example, in an online game, a legion can be considered as a user group, while in other scenarios, an interest group can be considered as a user group, and so on. Any suitable group can form a user group. Different user groups can have different user group IDs, and different user group IDs can identify different user groups. The user data can include, for example, user property data and/or user resource amount.

In various embodiments, each functional units/modules of the user management apparatus 400 can further be configured to implement user management methods as disclosed herein.

In various embodiments, the user management apparatus 400 can receive a batch operation request from a client, the batch operation request containing a first user identification (ID), a first user group ID, and a batch operation type ID. After determining that a first user indicated by the first user ID has a batch operation authorization and according to the batch operation type indicated by the batch operation type ID, the user management apparatus 400 can process the batch operation to users in the first user group indicated by the first user group ID or process the batch operation to users that request to join the first user group. Due to the batch operation mechanism, a batch operation with respect to multiple users can be accomplished based on an operation request from the client. As such, the batch operation mechanism can facilitate managing a large number of users, and can provide an easy interaction mechanism. In addition, an authentication mechanism for the batch operation is provided, which improves safety and reliability of the multi-user operation.

Figure 5:
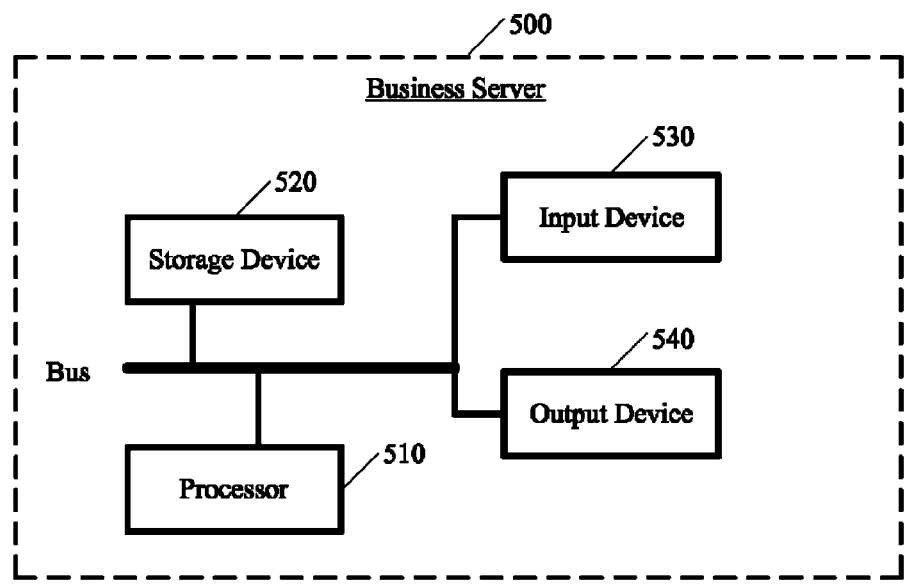
FIG. 5 depicts an exemplary business server consistent with various disclosed embodiments.

FIG. 5 depicts an exemplary business server 500 including: one or more processors 510 (although only one processor is illustrated in FIG. 5), a storage device 520, an input device 530 and an output device 540. In some embodiments, the processor 510, the storage device 520, the input device 530 and the output device 540 can be connected by a bus or other means. FIG. 5 illustrates a bus connection as an example.

The storage device 520 (e.g., a non-transitory computer-readable storage medium) can be used for storing software programs and modules. By running software programs and modules stored in the storage device 520, the processor 510 can perform various functional applications and data processing to execute various functions of the business server 500. The storage device 520 can include a program storage area and a data storage area. The program storage area can store the operating system, applications (such as sound playback, image playback, etc.) required by at least one function. In addition, storage device 520 can include a high-speed random access memory and a non-volatile memory. For example, the storage device 520 can include at least one disk memory, flash memory, and/or other volatile solid-state memory elements. The input device 530 can be used to receive inputted numeric or character information, and to generate signal input of keyboard related to the user settings and function controls of the business server 500.

The processor 510 can perform the following steps. For example, the processor 510 can receive a batch operation request from a client is received. The batch operation request contains a first user identification (ID), a first user group ID, and a batch operation type ID. The processor 510 can determine whether a first user indicated by the first user ID has a batch operation authorization and process a batch operation to users in a first user group indicated by the first user group ID or process the batch operation to users that request to join the first user group, when the first user is determined to have the batch operation authorization and according to a batch operation type indicated by the batch operation type ID.

In various embodiments, the batch operation type indicated by the batch operation type ID can be, for example, a batch removing operation, a batch adding operation, a batch user-data-modifying operation, and/or any suitable other type batch operations.

In various embodiments, before receiving the batch operation request from the client, the processor 510 is further configured to receive a login request containing the first user ID from the client. When the user indicated by the first user ID has the login authorization, the login authorization operation corresponding to the login request can be implemented. Of course, such login step can be omitted when there is no need to perform a business login.

In various embodiments, operation authorization of a user indicated by each user ID can be recorded in a database. Some users (e.g., a user-group administrator) may have the batch operation authorization, some users (e.g., a user-group administrator) may have a single user operation authorization, and some users (e.g., a general user in a user group) may not have any operation authorization.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a first threshold value (such as about two years, three years, five years, or other threshold value); can include that the user has a monthly telephone charge exceeding a second threshold value (such as about $80, $100, $150, $200 or other threshold value); and can include that the user has a user level exceeding a third threshold value.

To process the batch operation to users in the first user group having the first user group ID according to the batch operation type indicated by the batch operation type ID, the processor 510 can be configured to process the batch operation to number N1 users in the first user group having the first user group ID, according to the batch operation type indicated by the batch operation type ID. The number N1 users can include all of the users that satisfy a filter condition described in the filter-condition descriptive information in the first group, and the number N1 is a positive integer.

In various embodiments, to process the batch operation to the number N1 users in the first user group having the first user group ID according to the batch operation type indicated by the batch operation type ID, the processor 510 can be configured to batch update user data (e.g., including a saved telephone charge amount of a user, times of getting free monthly-combos of a user, a weapon equipment of a user, and/or an empirical value of a user) corresponding to the number N1 users in the first user group indicated by the first user group ID, according to the batch operation type indicated by the batch operation type ID.

In various embodiments, to process the batch operation to the number N1 users in the first user group having the first user group ID according to the batch operation type indicated by the batch operation type ID, the processor 510 can be configured to batch remove the number N1 users (in this example, the above-mentioned batch operation type corresponds to a batch removing operation) from the first user group indicated by the first user group ID according to the batch operation type indicated by the batch operation type ID.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a third threshold value (such as about one year, two years, five years, or other threshold value); can include that the user has a monthly telephone charge exceeding a fifth threshold value (such as about $50, $80, $100, $200 or other threshold value); and/or can include that the user has a user level exceeding a sixth threshold value.

To process the batch operation to users that request to join the first user group according to the batch operation type indicated by the batch operation type ID, the processor 510 can be configured to process the batch operation (e.g., a batch adding operation, a batch user-data-modifying operation, and/or other type batch operations) to number N2 users that request to join the first user group. The number N2 users can include all of users that request to join the first user group and that satisfy a filter condition described in the filter-condition descriptive information, and the number N2 is a positive integer.

In various embodiments, the batch operation type indicated by the batch operation type ID includes a batch joining user-group operation. To process the batch operation to the number N2 users that request to join the first user group according to the batch operation type indicated by the batch operation type ID, the processor 510 can be configured to batch join the number N2 users that request to join the first user group into the first user group.

In various embodiments, the processor 510 can be configured to receive a single-user-operation request from the client. The single-user-operation request contains a first user ID, a second user ID, and a single-user-operation type ID. The processor 510 can be configured to then determine whether the first user indicated by the first user ID has a single-user-operation authorization. When the first user is determined to have the single-user-operation authorization, a single-user operation can be processed to a second user indicated by the second user ID, according to a single-user-operation type indicated by the single-user-operation type ID. In various embodiments, the single-user-operation type can be, for example, an adding-to-user-group operation, a removing-from-user-group operation, a user-data-modifying operation, and/or other suitable operations. In various embodiments, the first user is an operating user, while the second user is a user being operated.

In various embodiments, to process a single-user operation to the second user indicated by the second user ID according to a single-user-operation type indicated by the single-user-operation type ID, the processor 510 can be configured to modify user data of the second user indicated by the second user ID according to a single-user-operation type indicated by the single-user-operation type ID. For example, the modifying of the user data can include modifying the saved telephone charge amount of a user, modifying the times of getting free monthly-combos of a user, modifying a weapon equipment of a user, and/or modifying an empirical value of a user. In this exemplary scenario, the single-user-operation is an operation for modifying user data.

In various embodiments, to process the single-user operation to the second user indicated by the second user ID according to the single-user-operation type indicated by the single-user-operation type ID, the processor 510 can be configured to add users of the second user indicated by the second user ID into a second user group according to a single-user-operation type indicated by the single-user-operation type ID. In this scenario, the single-user-operation is an operation of adding-to-user-group operation.

In various embodiments, to process the single-user operation to the second user indicated by the second user ID according to a single-user-operation type indicated by the single-user-operation type ID, the processor 510 can be configured to remove users of the second user indicated by the second user ID from the second user group according to a single-user-operation type indicated by the single-user-operation type ID. In this scenario, the single-user-operation can be an operation of removing-from-user-group operation.

It should be noted that, in different scenarios, the user group may have various forms/patterns. For example, in an online game, a legion can be considered as a user group, while in other scenarios, an interest group can be considered as a user group, and so on. Any suitable group can form a user group. Different user groups can have different user group IDs, and different user group IDs can identify different user groups. The user data can include, for example, user property data and/or user resource amount.

As such, after receiving the first user ID, the first user group ID, and the batch operation type ID from the client, the processor 510 can be configured to process the batch operation to users in the first user group indicated by the first user group ID or to users that request to join the first user group, when the first user is determined to have the batch operation authorization and according to a batch operation type indicated by the batch operation type ID. Due to the batch operation mechanism, a batch operation with respect to multiple users can be accomplished based on an operation request from the client. In this manner, the batch operation mechanism can facilitate managing a large number of users, and can provide an easy interaction mechanism. In addition, an authentication mechanism for the batch operation is provided, which improves safety and reliability of the multi-user operation.

Figure 6:
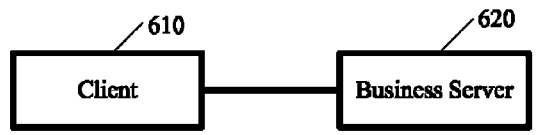
FIG. 6 depicts an exemplary communication system consistent with various disclosed embodiments.

FIG. 6 depicts an exemplary a communication system including a client 610 and a business server 620. The client 610 is configured to send a batch operation request containing a first user identification (ID), a first user group ID, and a batch operation type ID.

The business server 620 is configured to receive the batch operation request from the client; to determine whether a first user indicated by the first user ID has a batch operation authorization; and process a batch operation to users in a first user group indicated by the first user group ID or to process the batch operation to users that request to join the first user group, when the first user is determined to have the batch operation authorization and according to a batch operation type indicated by the batch operation type ID.

In various embodiments, the batch operation type indicated by the batch operation type ID can be, for example, a batch removing operation, a batch adding operation, a batch user-data-modifying operation, and/or any suitable other type batch operations.

In various embodiments, before receiving the batch operation request from the client, the business server 620 can be configured to receive a login request containing the first user ID from the client. When the user indicated by the first user ID has the login authorization, the login authorization operation corresponding to the login request can be implemented. Of course, such login step can be omitted when there is no need to perform a business login.

In various embodiments, operation authorization of a user indicated by each user ID can be recorded in a database. Some users (e.g., a user-group administrator) may have the batch operation authorization, some users (e.g., a user-group administrator) may have a single user operation authorization, and some users (e.g., a general user in a user group) may not have any operation authorization.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a first threshold value (such as about two years, three years, five years, or other threshold value); can include that the user has a monthly telephone charge exceeding a second threshold value (such as about $80, $100, $150, $200 or other threshold value); and can include that the user has a user level exceeding a third threshold value.

To process the batch operation to users in the first user group having the first user group ID according to the batch operation type indicated by the batch operation type ID, the business server 620 can be configured to process the batch operation to number N1 users in the first user group having the first user group ID, according to the batch operation type indicated by the batch operation type ID. The number N1 users can include all of the users that satisfy a filter condition described in the filter-condition descriptive information in the first group, and the number N1 is a positive integer.

In various embodiments, to process the batch operation to the number N1 users in the first user group having the first user group ID according to the batch operation type indicated by the batch operation type ID, the business server 620 can be configured to batch update user data (e.g., including a saved telephone charge amount of a user, times of getting free monthly-combos of a user, a weapon equipment of a user, and/or an empirical value of a user) corresponding to the number N1 users in the first user group indicated by the first user group ID, according to the batch operation type indicated by the batch operation type ID.

In various embodiments, to process the batch operation to the number N1 users in the first user group having the first user group ID according to the batch operation type indicated by the batch operation type ID, the business server 620 can be configured to batch remove the number N1 users (in this example, the above-mentioned batch operation type corresponds to a batch removing operation) from the first user group indicated by the first user group ID according to the batch operation type indicated by the batch operation type ID.

In various embodiments, the batch operation request further contains filter-condition descriptive information. For example, according to different application scenarios, various filter conditions can be described in the filter-condition descriptive information. In various embodiments, the filter conditions can include that the user uses a network in a number of years exceeding a third threshold value (such as about one year, two years, five years, or other threshold value); can include that the user has a monthly telephone charge exceeding a fifth threshold value (such as about $50, $80, $100, $200 or other threshold value); and/or can include that the user has a user level exceeding a sixth threshold value.

To process the batch operation to users that request to join the first user group according to the batch operation type indicated by the batch operation type ID, the business server 620 can be configured to process the batch operation (e.g., a batch adding operation, a batch user-data-modifying operation, and/or other type batch operations) to number N2 users that request to join the first user group. The number N2 users can include all of users that request to join the first user group and that satisfy a filter condition described in the filter-condition descriptive information, and the number N2 is a positive integer.

In various embodiments, the batch operation type indicated by the batch operation type ID includes a batch joining user-group operation. To process the batch operation to the number N2 users that request to join the first user group according to the batch operation type indicated by the batch operation type ID, the business server 620 can be configured to batch join the number N2 users that request to join the first user group into the first user group.

In various embodiments, the business server 620 can be configured to receive a single-user-operation request from the client. The single-user-operation request contains a first user ID, a second user ID, and a single-user-operation type ID. The business server 620 can be configured to then determine whether the first user indicated by the first user ID has a single-user-operation authorization. When the first user is determined to have the single-user-operation authorization, a single-user operation can be processed to a second user indicated by the second user ID, according to a single-user-operation type indicated by the single-user-operation type ID. In various embodiments, the single-user-operation type can be, for example, an adding-to-user-group operation, a removing-from-user-group operation, a user-data-modifying operation, and/or other suitable operations. In various embodiments, the first user is an operating user, while the second user is a user being operated.

In various embodiments, to process a single-user-operation to the second user indicated by the second user ID according to a single-user-operation type indicated by the single-user-operation type ID, the business server 620 can be configured to modify user data of the second user indicated by the second user ID according to a single-user-operation type indicated by the single-user-operation type ID. For example, the modifying of the user data can include modifying the saved telephone charge amount of a user, modifying the times of getting free monthly-combos of a user, modifying a weapon equipment of a user, and/or modifying an empirical value of a user. In this exemplary scenario, the single-user-operation is an operation for modifying user data.

In various embodiments, to process the single-user-operation to the second user indicated by the second user ID according to the single-user-operation type indicated by the single-user-operation type ID, the business server 620 can be configured to add users of the second user indicated by the second user ID into a second user group according to a single-user-operation type indicated by the single-user-operation type ID. In this scenario, the single-user-operation is an operation of adding-to-user-group operation.

In various embodiments, to process the single-user-operation to the second user indicated by the second user ID according to a single-user-operation type indicated by the single-user-operation type ID, the business server 620 can be configured to remove users of the second user indicated by the second user ID from the second user group according to a single-user-operation type indicated by the single-user-operation type ID. In this scenario, the single-user-operation can be an operation of removing-from-user-group operation.

It should be noted that, in different scenarios, the user group may have various forms/patterns. For example, in an online game, a legion can be considered as a user group, while in other scenarios, an interest group can be considered as a user group, and so on. Any suitable group can form a user group. Different user groups can have different user group IDs, and different user group IDs can identify different user groups. The user data can include, for example, user property data and/or user resource amount.

As such, after receiving the first user ID, the first user group ID, and the batch operation type ID from the client 610, the business server 620 can be configured to process the batch operation to users in the first user group indicated by the first user group ID or to users that request to join the first user group, when the first user is determined to have the batch operation authorization and according to a batch operation type indicated by the batch operation type ID. Due to the batch operation mechanism, a batch operation with respect to multiple users can be accomplished based on an operation request from the client. In this manner, the batch operation mechanism can facilitate managing a large number of users, and can provide an easy interaction mechanism. In addition, an authentication mechanism for the batch operation is provided, which improves safety and reliability of the multi-user operation.

Figure 7:
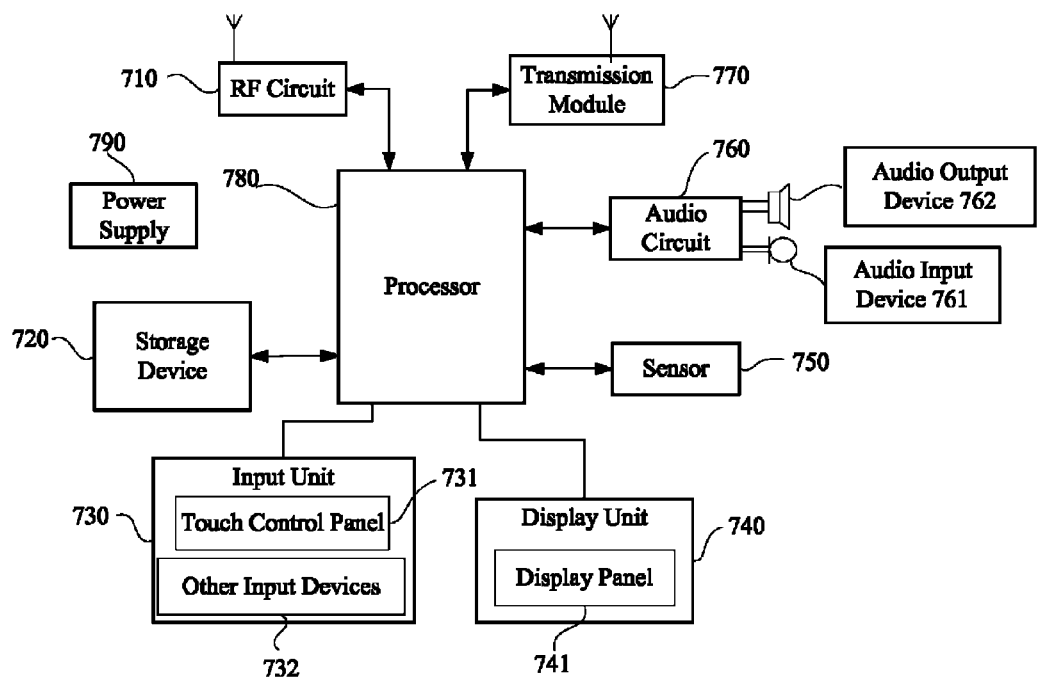
FIG. 7 depicts an exemplary client terminal consistent with various disclosed embodiments.

FIG. 7 depicts at least a portion of an exemplary client terminal device. The exemplary client terminal device can include a mobile phone, a tablet computer, a PDA (personal digital assistant), a POS (point of sales), a car-carried-computer, or any desired terminal devices. In other examples, the client terminal device can include, e-book readers, moving picture experts group audio layer III (MP3) players, moving picture experts group audio layer IV (MP4) players, laptops, and/or desktop computers. A client can be installed in a client terminal device. In one embodiment, the client terminal device can be a mobile phone.

As shown in FIG. 7, the exemplary client terminal device 700 can include an RF (Radio Frequency) circuit 710, a storage device 720 including one or more non-transitory computer-readable storage media, an input unit 730, a display unit 740, a sensor 750, an audio circuit 760, a transmission module 770, a processor 780 including one or more processing cores, a power supply 790, and/or other components. In various embodiments, the client terminal device (s) described herein can include more or less components as depicted in FIG. 7. Certain components/parts can be omitted, combined, replaced, and/or added.

The RF circuit 710 can be used to send/receive information or send/receive signal during communication. In particular, after receiving downlink information from a base station, such information can be processed by the one or more processors 780. Further, the data related to the uplink can be sent to the base station. Generally, the RF circuit 710 can include, but be not limited to, an antenna, at least one amplifier, a tuner, one or more oscillators, a user identity module (SIM) card, a transceiver, a coupler, LNA (i.e., Low Noise Amplifier), a duplexer, etc. In addition, the RF circuit 710 can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service).

The storage device 720 can be used for storing software programs and modules. By running software programs and modules stored in the storage device 720, the processor 780 can perform various functional applications and data processing to achieve business processing such as user managements. The storage device 720 can include a program storage area and a data storage area. The program storage area can store the operating system, applications (such as sound playback, image playback, etc.) required by at least one function. The data storage area can store data (such as audio data, phone book, etc.) created when using the client terminal device. In addition, the storage device 720 can include a high-speed random access memory and a non-volatile memory. For example, the storage device 720 can include at least one disk memory, flash memory, and/or other volatile solid-state memory elements. Accordingly, the storage device 720 can further include a memory controller to provide the processor 780 and the input unit 730 with access to the storage device 720.

The input unit 730 can be used to receive inputted numeric or character information, and to generate signal input of keyboard, mouse, joystick, and trackball or optical signal input related to the user settings and function controls. Specifically, the input unit 730 can include a touch control panel 731 and other input device(s) 732. The touch-sensitive surface 731, also known as a touch screen or touch panel, can collect touch operations that a user conducts on or near the touch-sensitive surface 731. For example, a user can use a finger, a stylus, and any other suitable object or attachment on the touch-sensitive surface 731 or on an area near the touch-sensitive surface 731. The touch-sensitive surface 731 can drive a connecting device based on a preset program. Optionally, the touch control panel 731 can include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 780, and receive commands sent from the processor 780 to execute. Furthermore, the touch control panel 731 can be realized by resistive, capacitive, infrared surface acoustic wave, and/or other types of surface touch. In addition to the touch control panel 731, the input unit 730 can also include other input device(s) 732. Specifically, the other input device(s) 732 can include, but be not limited to, a physical keyboard, function keys (such as volume control buttons, switch buttons, etc.), a trackball, a mouse, an operating lever, or combinations thereof.

The display unit 740 can be used to display information inputted by the user, information provided to the user, and a variety of graphical user interfaces of the client terminal device 700. These graphical user interfaces can be formed by images, text, icons, videos, and/or any combinations thereof. The display unit 740 can include a display panel 741 configured by, e.g., LCD (Liquid Crystal Display), OLED (Organic Light-Emitting Diode), etc. Further, the touch control panel 731 can cover the display panel 741. When the touch control panel 731 detects a touch operation on or near the touch sensitive surface, the touch operation can be sent to the processor 780 to determine a type of the touch operation. Accordingly, the processor 780 can provide visual output on the display panel 741. Although in FIG. 7 the touch-sensitive surface 731 and the display panel 741 are shown as two separate components to achieve input and output functions, in some embodiments, the touch control panel 731 and the display panel 741 can be integrated to perform input and output functions.

The client terminal device 700 in FIG. 7 can further include at least one sensor 750, such as optical sensors, motion sensors, and other suitable sensors. Specifically, the optical sensors can include an ambient optical sensor and a proximity sensor. The ambient optical sensor can adjust brightness of the display panel 741 according to the brightness of ambient light. The proximity sensor can turn off the display panel 741 and/or turn on backlighting, when the client terminal device 700 moves to an ear. As a type of motion sensor, a gravity sensor can detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), and/or vibration recognition related functions (e.g., pedometer, percussion, etc.). The client terminal device 700 can also be configured with, e.g., a gyroscope, a barometer, a hygrometer, a thermometer, an infrared sensor, and/or other sensors.

The audio circuit 760 can include an audio input device 761 such as a microphone and an audio output device 762 such as a speaker and can provide an audio interface between the user and client terminal device 700. The audio circuit 760 can transmit an electrical signal converted from the received audio data to the speaker 761 to convert into audio signal output. On the other hand, the microphone 762 can convert the collected sound signal to an electrical signal, which can be received by the audio circuit 760 to convert into audio data. The audio data can be output to the processor 780 for processing and then use the RF circuit 710 to transmit to, e.g., another client terminal device. Alternatively, the audio data can be output to the storage device 720 for further processing. The audio circuit 760 can also include an earplug jack to provide communications between the peripheral headset and the client terminal device 700.

The client terminal device 700 can use the transmission module 770 to help users send/receive emails, browse websites, access streaming media, etc. The transmission module 770 can provide users with a wireless or wired broadband Internet access. In various embodiments, the transmission module 770 can be configured within or outside of the client terminal device 700 as depicted in FIG. 7.

The processor 780 can be a control center of the terminal 700: using a variety of interfaces and circuits to connect various parts, e.g., within a mobile phone; running or executing software programs and/or modules stored in the storage device 720; calling the stored data in the storage device 720; and/or performing various functions and data processing of the client terminal device 700, e.g., to monitor the overall mobile phone. Optionally, the processor 780 can include one or more processing cores. In an exemplary embodiment, the processor 780 can integrate application processor with modulation and demodulation processor. The application processor is mainly used to process operating system, user interface, and applications. The modulation and demodulation processor is mainly used to deal with wireless communications. In various embodiments, the modulation and demodulation processor may or may not be integrated into the processor 780.

The client terminal device 700 can further include a power supply 790 (such as a battery) to power various components of the client terminal device. In an exemplary embodiment, the power supply can be connected to the processor 780 via the power management system, and thus use the power management system to manage charging, discharging, and/or power management functions. The power supply 790 can also include one or more DC or AC power supplies, a recharging system, a power failure detection circuit, a power converter or inverter, a power status indicator, and/or any other suitable components.

Although not shown in FIG. 7, the client terminal device 700 can further include a camera, a Bluetooth module, etc. without limitations.

The processor(s) 780 of the client terminal device 700 can upload executable files corresponding to processes of one or more programs to the storage device 720. The processor(s) 780 can then be used to run these one or more programs stored in the storage device 720.

Conventional guild system can be implemented on webpage-based side in a form that relationship chain of guild players (or users) is precipitated on the webpage side. Players cannot organize activities and communicate with each other on the webpage-based side. Guild management is extremely inconvenient. The disclosed methods, apparatus, and systems can provide third-party software systems to perform joining, approval, removal, appointing jobs, incentive payments, and/or other daily management operations of players (or users) in the guild system (e.g., for an online game). In addition, the third-party software systems can directly use text and/or voice communication. It is therefore convenient for organizing activities and for player management of the guild system. For example, the disclosed methods, apparatus, and systems can support a guild system having tens of thousands of players.

In one embodiment, the third-party software system can provide a guild management module. Guild administrator can use an exclusive management module to perform management functions: to batch approve, to expel, to upgrade, to have game guild bound with the third-party software system, to distribute reward, to announce, and to recruit players (users). Guild administrator can use one application to perform management operations of different servers. By using the communication function of the third-party software system, the Guild administrator can organize a variety of online activities and can precipitate the relationship chains of players.

In an exemplary embodiment, a player can login a legion web system. The "tens of thousands the Guild" system can determine an authorization of the player and to determine if the player has the authorization to operate a management module. The player who has the authorization can perform batch operations of the "tens of thousands the Guild" and also can perform single-user operations. For the batch operation, the system can record the batch operation and the backend server can timed-ly process the batch operations. For single-user operations, player data can be operated directly. In this manner, batch removing, batch approving, batch using roles (e.g., an alternative ID of a same player that others may or may not know) can be performed.

It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

In the present disclosure each embodiment is progressively described, i.e., each embodiment is described and focused on difference between embodiments. Similar and/or the same portions between various embodiments can be referred to with each other. In addition, exemplary apparatus and/or systems are described with respect to corresponding methods.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. A variety of components described herein including elements, modules, units, engines, and services can be executed in the computing system. The methods, apparatus, and/or systems can be implemented in a software manner. Of course, the methods, apparatus, and/or systems can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

In various embodiments, the disclosed units/modules can be configured in one apparatus (e.g., a processing unit) or configured in multiple apparatus as desired. The units/modules disclosed herein can be integrated in one unit/module or in multiple units/modules. Each of the units/modules disclosed herein can be divided into one or more sub-units/modules, which can be recombined in any manner. In addition, the units/modules can be directly or indirectly coupled or otherwise communicated with each other, e.g., by suitable interfaces.

One of ordinary skill in the art would appreciate that suitable software and/or hardware (e.g., a universal hardware platform) may be included and used in the disclosed methods, apparatus, and/or systems. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "including", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In the disclosed user management methods, apparatus, and communication systems, after receiving a first user ID, a first user group ID, and a batch operation type ID from a client, a batch operation is processed to users in the first user group indicated by the first user group ID or the batch operation is processed to users that request to join the first user group, when the first user is determined to have the batch operation authorization and according to a batch operation type indicated by the batch operation type ID.

Due to the batch operation mechanism, a batch operation with respect to multiple users can be accomplished based on an operation request from the client. The batch operation mechanism can facilitate managing a large number of users, and can provide an easy interaction mechanism between users. In addition, an authentication mechanism for the batch operation is provided, which improves safety and reliability of the multi-user operation.

What is claimed is:

1. A user management method, comprising:
    receiving a batch operation request from a client, wherein the batch operation request contains a first user identification (ID), a first user group ID, and a batch operation type ID, wherein the batch operation request comprises a filter-condition descriptive information describing multiple filter conditions according to different application scenarios;
    determining whether a first user indicated by the first user ID has a batch operation authorization; and
    processing a batch operation to users in a first user group indicated by the first user group ID or processing the batch operation to users that request to join the first user group, when the first user is determined to have the batch operation authorization and according to a batch operation type indicated by the batch operation type ID.

2. The method according to claim 1, wherein the step of processing the batch operation to users in the first user group having the first user group ID according to the batch operation type indicated by the batch operation type ID comprises:
    according to the batch operation type indicated by the batch operation type ID, processing the batch operation to number N1 users in the first user group having the first user group ID, wherein the number N1 users comprise all of users that satisfy the filter condition described in the filter-condition descriptive information in the first group, and the number N1 is a positive integer.

3. The method according to claim 2, wherein the step of, according to the batch operation type indicated by the batch operation type ID, processing the batch operation to the number N1 users in the first user group having the first user group ID comprises:
    according to the batch operation type indicated by the batch operation type ID, batch updating user data corresponding to the number N1 users in the first user group indicated by the first user group ID; or
    according to the batch operation type indicated by the batch operation type ID, batch removing the number N1 users from the first user group indicated by the first user group ID.

4. The method according to claim 1, wherein the step of according to the batch operation type indicated by the batch operation type ID, processing the batch operation to the users that request to join the first user group comprises:

according to the batch operation type indicated by the batch operation type ID, processing the batch operation to number N2 users that request to join the first user group, wherein the number N2 users comprise all of users that request to join the first user group and that satisfy the filter condition described in the filter-condition descriptive information, and the number N2 is a positive integer.

5. The method according to claim 4, wherein the batch operation type indicated by the batch operation type ID includes a batch-joining user-group operation, and the step of, according to the batch operation type indicated by the batch operation type ID, processing the batch operation to the number N2 users that request to join the first user group comprises:

batch joining the number N2 users that request to join the first user group into the first user group.

6. The method according to claim 5, further comprising:
receiving a single-user-operation request from the client, wherein the single-user-operation request contains the first user ID, a second user ID, and a single-user-operation type ID;
determining whether the first user indicated by the first user ID has a single-user-operation authorization; and
when the first user is determined to have the single-user-operation authorization, processing a single-user operation to a second user indicated by the second user ID, according to a single-user-operation type indicated by the single-user-operation type ID in the single-user-operation request.

7. The method according to claim 1, wherein the multiple filter conditions comprise the user uses a network in a number of years exceeding a first threshold value, the user has a monthly telephone charge exceeding a second threshold value, or the user has a user level exceeding a third threshold value.

8. A user management apparatus, comprising:
a processor;
at least one non-transitory computer-readable storage media coupled to the processor; and
a plurality of program units stored in the at least one non-transitory computer-readable storage media to be executed by the processor, the plurality of program units comprising:
a receiving unit receiving a batch operation request from a client, wherein the batch operation request comprises a first user identification (ID), a first user group ID, and a batch operation type ID; the batch operation request comprises a filter-condition descriptive information describing multiple filter conditions according to different application scenarios;
a determining unit determining whether a first user indicated by the first user ID has a batch operation authorization; and
a batch operation unit processing a batch operation to users in a first user group indicated by the first user group ID or processing the batch operation to users that request to join the first user group, when the first user is determined to have the batch operation authorization and according to a batch operation type indicated by the batch operation type ID.

9. The apparatus according to claim 8, wherein:
processing a batch operation to users in a first user group indicated by the first user group ID, comprises:
processing the batch operation to users in the first user group having the first user group ID according to the batch operation type indicated by the batch operation type ID, the batch operation unit is configured, according to the batch operation type indicated by the batch operation type ID, to process the batch operation to number N1 users in the first user group having the first user group ID; and
the number N1 users comprise all of users that satisfy a filter condition described in the filter-condition descriptive information in the first group, and the number N1 is a positive integer.

10. The apparatus according to claim 9, wherein, to process the batch operation to the number N1 users in the first user group indicated by the first user group ID according to the batch operation type indicated by the batch operation type ID, the batch operation unit is configured, according to the batch operation type indicated by the batch operation type ID, to batch update user data corresponding to the number N1 users in the first user group indicated by the first user group ID, or according to the batch operation type indicated by the batch operation type ID, to batch delete the number N1 users from the first user group indicated by the first user group ID.

11. The apparatus according to claim 8, wherein:
processing the batch operation to users that request to join the first user group, comprises:
processing the batch operation to the users that request to join the first user group according to the batch operation type indicated by the batch operation type ID, the batch operation unit is configured, according to the batch operation type indicated by the batch operation type ID, to perform the batch operation to number N2 users that request to join the first user group;
the number N2 users comprise all of users that request to join the first user group and that satisfy a filter condition described in the filter-condition descriptive information, and the number N2 is a positive integer.

12. The apparatus according to claim 11, wherein:
the receiving unit further receiving a single-user-operation request from the client, wherein the single-user-operation request comprises the first user ID, a second user ID, and a single-user-operation type ID;
the determining unit further determining whether the first user indicated by the first user ID has a single-user-operation authorization; and
a single-user operation unit, when the first user is determined to have the single-user-operation authorization, processing a single-user operation to a second user indicated by the second user ID, according to a single-user-operation type indicated by the single-user-operation type ID.

13. The apparatus according to claim 8, wherein the multiple filter conditions comprise the user uses a network in a number of years exceeding a first threshold value, the user has a monthly telephone charge exceeding a second threshold value, or the user has a user level exceeding a third threshold value.

14. A communication system, comprising:
a client sending a batch operation request, wherein the batch operation request comprises a first user identification (ID), a first user group ID, and a batch operation type ID; the batch operation request comprises a filter-condition descriptive information describing multiple filter conditions according to different application scenarios; and a business server receiving the batch operation request from the client, determining whether a first user indicated by the first user ID has a batch operation authorization; and processing a batch operation to users in a first user group indicated by the first user group ID or processing the batch operation to users that request to join the first user group, when the first user is determined to have the batch operation authorization and according to a batch operation type indicated by the batch operation type ID.

15. The system according to claim 14, wherein the client is configured in a mobile phone.

16. The system according to claim 14, wherein processing the batch operation to users in the first user group indicated by the first user group ID, comprises:
processing the batch operation to users in the first user group having the first user group ID according to the batch operation type indicated by the batch operation type ID, the business server is configured, according to the batch operation type indicated by the batch operation type ID, to process the batch operation to number N1 users in the first user group having the first user group ID; and wherein the number N1 users comprise all of users that satisfy a filter condition described in the filter-condition descriptive information in the first group, and the number N1 is a positive integer.

17. The system according to claim 16, wherein, to process the batch operation to the number N1 users in the first user group indicated by the first user group ID according to the batch operation type indicated by the batch operation type ID, the business server is configured, according to the batch operation type indicated by the batch operation type ID, to batch update user data corresponding to the number N1 users in the first user group indicated by the first user group ID, or according to the batch operation type indicated by the batch operation type ID, to batch delete the number N1 users from the first user group indicated by the first user group ID.

18. The system according to claim 14, wherein processing the batch operation to users that request to join the first user group, comprises:
processing the batch operation to the users that request to join the first user group according to the batch operation type indicated by the batch operation type ID, the business server is configured, according to the batch operation type indicated by the batch operation type ID, to perform the batch operation to number N2 users that request to join the first user group; and wherein the number N2 users comprise all of users that request to join the first user group and that satisfy a filter condition described in the filter-condition descriptive information, and the number N2 is a positive integer.

19. The system according to claim 18, wherein the business server further receiving a single-user-operation request from the client, the single-user-operation request comprising the first user ID, a second user ID, and a single-user-operation type ID; determining whether the first user indicated by the first user ID has a single-user-operation authorization; and, when the first user is determined to have the single-user-operation authorization, processing a single-user operation to a second user indicated by the second user ID according to a single-user-operation type indicated by the single-user-operation type ID.

20. The system according to claim 14, wherein the multiple filter conditions comprise the user uses a network in a number of years exceeding a first threshold value, the user has a monthly telephone charge exceeding a second threshold value, or the user has a user level exceeding a third threshold value.

* * * * *